(12) United States Patent
Shinavski et al.

(10) Patent No.: US 11,162,377 B2
(45) Date of Patent: Nov. 2, 2021

(54) CERAMIC MATRIX COMPOSITE TURBINE VANE AND METHOD FOR MAKING

(71) Applicants: Rolls-Royce High Temperature Composites Inc., Cypress, CA (US); Rolls-Royce North American Technologies Inc., Indianapolis, IN (US)

(72) Inventors: Robert J. Shinavski, Mission Viejo, CA (US); Thomas Tran, Fountain Valley, CA (US); Kevin Lukhard, Anaheim, CA (US); Ted J. Freeman, Danville, IN (US); Steffan Brown, Long Beach, CA (US)

(73) Assignees: Rolls-Royce High Temperature Composites Inc., Cypress, CA (US); Rolls-Royce North American Technologies Inc., Indianapolis, IN (US)

( * ) Notice: Subject to any disclaimer, the term of this patent is extended or adjusted under 35 U.S.C. 154(b) by 243 days.

(21) Appl. No.: 16/428,319

(22) Filed: May 31, 2019

(65) Prior Publication Data
US 2020/0378267 A1    Dec. 3, 2020

(51) Int. Cl.
*F01D 9/04* (2006.01)
*F01D 5/28* (2006.01)
*F01D 25/00* (2006.01)

(52) U.S. Cl.
CPC .......... *F01D 9/041* (2013.01); *F01D 25/005* (2013.01); *F05D 2220/32* (2013.01); *F05D 2230/60* (2013.01); *F05D 2240/12* (2013.01); *F05D 2300/6012* (2013.01); *F05D 2300/6033* (2013.01)

(58) Field of Classification Search
CPC .......... F01D 9/041; F01D 9/042; F01D 9/044; F01D 25/005
See application file for complete search history.

(56) References Cited

U.S. PATENT DOCUMENTS

| | | | |
|---|---|---|---|
| 6,280,550 B1 | 8/2001 | Steibel et al. | |
| 6,648,597 B1 * | 11/2003 | Widrig | C04B 37/001 415/200 |
| 7,799,405 B1 | 9/2010 | Vance et al. | |
| 8,221,836 B2 | 7/2012 | Philippe et al. | |
| 8,709,314 B2 | 4/2014 | Mahieu et al. | |
| 9,080,454 B2 | 7/2015 | Coupe et al. | |
| 9,212,560 B2 | 12/2015 | McCaffrey | |

(Continued)

FOREIGN PATENT DOCUMENTS

| | | |
|---|---|---|
| EP | 1367037 A2 | 12/2003 |
| EP | 3315727 A1 | 5/2018 |

OTHER PUBLICATIONS

Extended European Search Report, European Application No. 20172882.1-1004, dated Sep. 21, 2020, 5 pages.

*Primary Examiner* — Justin D Seabe
(74) *Attorney, Agent, or Firm* — Barnes & Thornburg LLP (57) ABSTRACT

A turbine vane comprising ceramic matrix composite materials. The turbine vane includes an vane support core, an airfoil, and a pair of end walls that are spaced apart from one another to define a gas path. The turbine vane is formed from a plurality of ceramic plies or preforms that are infiltrated with ceramic matrix material to form a one-piece ceramic matrix composite turbine vane.

20 Claims, 3 Drawing Sheets

(56) References Cited

U.S. PATENT DOCUMENTS

| | | |
|---|---|---|
| 9,308,708 B2 | 4/2016 | Kleinow |
| 9,803,486 B2 | 10/2017 | Freeman et al. |
| 9,957,821 B2 | 5/2018 | Duelm et al. |
| 10,132,170 B2 | 11/2018 | Garcia-Crespo et al. |
| 10,174,627 B2 | 1/2019 | Chang et al. |
| 10,648,352 B2 * | 5/2020 | Paige ..................... F01D 5/282 |
| 10,724,387 B2 * | 7/2020 | Farrar ..................... F01D 9/041 |
| 2009/0014926 A1 | 1/2009 | Marini |
| 2011/0265406 A1 | 11/2011 | Morrison et al. |
| 2014/0010662 A1 | 1/2014 | Duelm et al. |
| 2014/0356151 A1 | 12/2014 | Fremont et al. |
| 2015/0003989 A1 | 1/2015 | Uskert et al. |
| 2015/0040396 A1 | 2/2015 | Fremont et al. |
| 2018/0179906 A1 | 6/2018 | Schetzel et al. |
| 2018/0230823 A1 | 8/2018 | Sippel et al. |
| 2018/0370158 A1 | 12/2018 | Gallier et al. |
| 2019/0338660 A1 * | 11/2019 | Underwood ............ F01D 25/12 |
| 2019/0368363 A1 * | 12/2019 | Walston .................. F01D 5/284 |

\* cited by examiner

CERAMIC MATRIX COMPOSITE TURBINE VANE AND METHOD FOR MAKING

FIELD OF THE DISCLOSURE

The present disclosure relates generally to gas turbine engines, and more specifically, to turbine vane assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

According to a first aspect of the present disclosure, a turbine vane made from ceramic matrix composite materials and adapted for use in an aerospace gas turbine engine includes a vane support core, an airfoil, a first end wall, and a second end wall. The vane support core is arranged along an axis between a first end and a second end. The airfoil is arranged radially outward from the vane support core relative to the axis and spaced apart axially from the first end and the second end of the vane support core The first end wall is spaced axially from the second end wall and each end wall includes a flow path ply with a flow path surface facing toward the airfoil.

In some embodiments, the first end wall further includes a locking layup integrated with the vane support core and the flow path ply of the first end wall. The locking layup includes a core overwrap engaged with an outer surface of the vane support core and a backing ply engaged with the flow path ply of the first end wall opposite the flow path surface.

In some embodiments, the core overwrap is formed with a locking flange that flares radially outward away from the airfoil core relative to the axis. The backing ply is formed to include a cutout that receives the vane support core and the core overwrap. The backing ply also has an angled surface that engages with the locking flange of the core overwrap so that when the locking layup is integrated with the vane support core and the flow path ply of the first end wall, the airfoil and the first end wall are blocked from axial movement relative to the vane support core.

In some embodiments, a space is formed radially between the vane support core and the locking flange and the locking layup further includes an end wall filler positioned in the space.

In some embodiments, the airfoil includes an airfoil overwrap ply that extends circumferentially around the vane support core and a trailing edge filler insert offset radially from the airfoil core relative to the axis. The airfoil overwrap ply has a flared end that abuts the flow path surface of the flow path ply. The trailing edge insert is positioned radially between an outer surface of the vane support core and an inner surface of the airfoil overwrap ply.

In some embodiments, the core overwrap extends from the first end of the vane support core to the flow path ply and the locking flange abuts the flow path ply of the first end wall.

In some embodiments, the second end wall further includes a second locking layup integrated with the vane support core and the second flow path ply to block axial movement of the airfoil and the second end wall relative to the vane support core. The second locking layup includes a second core overwrap engaged with the outer surface of the vane support core and a second backing ply engaged with the flow path ply of the second end wall. The second core overwrap is formed with a second locking flange that flares radially outward away from the vane support core relative to the axis. The second backing ply is formed to include a second cutout that receives the vane support core and the second core overwrap and has a second angled surface that engages with the second locking flange of the second core overwrap.

In some embodiments, the core overwrap includes a first core overwrap with the locking flange that flares radially outward away from the vane support core and engages the angled surface of the backing ply and a second core overwrap with a second locking flange that extends outwardly from the vane support core and engages the backing ply and is spaced apart from the locking flange of the first core overwrap to locate the angled surface of the backing ply axially between the locking flange of the first core overwrap and the second locking flange of the second core overwrap.

In some embodiments, the vane support core is formed to include a hollow cavity that extends axially through the vane support core along the axis.

In some embodiments, the flow path ply includes a plurality of flow path plies and the backing ply includes a plurality of backing plies and the number of backing plies is greater than the number of flow path plies.

In some embodiments, the locking flange extends outwardly away from the vane support core at an angle of about 45 degrees relative to the axis.

According to another aspect of the present disclosure, a bladed component made from ceramic matrix composite materials includes a support core, an airfoil, and an end wall. The support core is arranged along an axis and formed to include a hollow cavity that extends through the support core along the axis. The airfoil is coupled with the support core radially outward from the support core. The end wall includes a flow path ply and a backing ply each arranged generally perpendicular to the axis. The end wall is blocked from axial movement relative to the support core by a core overwrap integrated with the support core and having a flared end interlocked with the flow path ply and the backing ply.

In some embodiments, the backing ply is formed to include a cutout that receives the support core and the core overwrap and has a surface that extends radially away from the support core at an angle and the flared end of the core overwrap engages the surface.

In some embodiments, a space is formed radially between the support core and the flared end of the core overwrap and the end wall further includes an end wall filler positioned in the space.

In some embodiments, the airfoil includes an airfoil overwrap ply that extends circumferentially around the support core and a trailing edge filler insert offset radially from the support sore relative to the axis.

According to another aspect of the present disclosure, a method of constructing a turbine vane adapted for used in an aerospace gas turbine engine with a central rotation axis includes: providing an vane support core that extends along an axis between a first end of the vane support core and a second end of the vane support core; coupling an end wall to the vane support core between the first end of the vane support core and the second end of the vane support core, the end wall including a flow path ply defining a flow path surface and a backing ply abutting the flow path ply opposite the flow path surface; overwrapping the vane support core with an airfoil overwrap ply adjacent to the flow path ply and a core overwrap adjacent to the backing ply; flaring an axially-inner end of the core overwrap radially outward away from the vane support core; and interlocking the axially-inner end of the core overwrap with the flow path ply and the backing ply to block movement of the airfoil overwrap ply and the end wall in an axial direction relative to the vane support core.

In some embodiments, the end wall is a first end wall and method further includes: coupling a second end wall to the vane support core between the first end of the vane support core and the second end of the vane support core, the second end wall spaced axially from the first end wall to define a flow therebetween, the second end wall including a second flow path ply defining a second flow path surface and a second backing ply abutting the second flow path ply opposite the second flow path surface; overwrapping the vane support core with a second core overwrap adjacent to the second backing ply; flaring an axially-inner end of the second core overwrap radially outward away from the vane support core; and interlocking the axially-inner end of the second core overwrap with the second flow path ply and the second backing ply to block movement of the airfoil overwrap ply and the second end wall in an axial direction relative to the vane support core.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
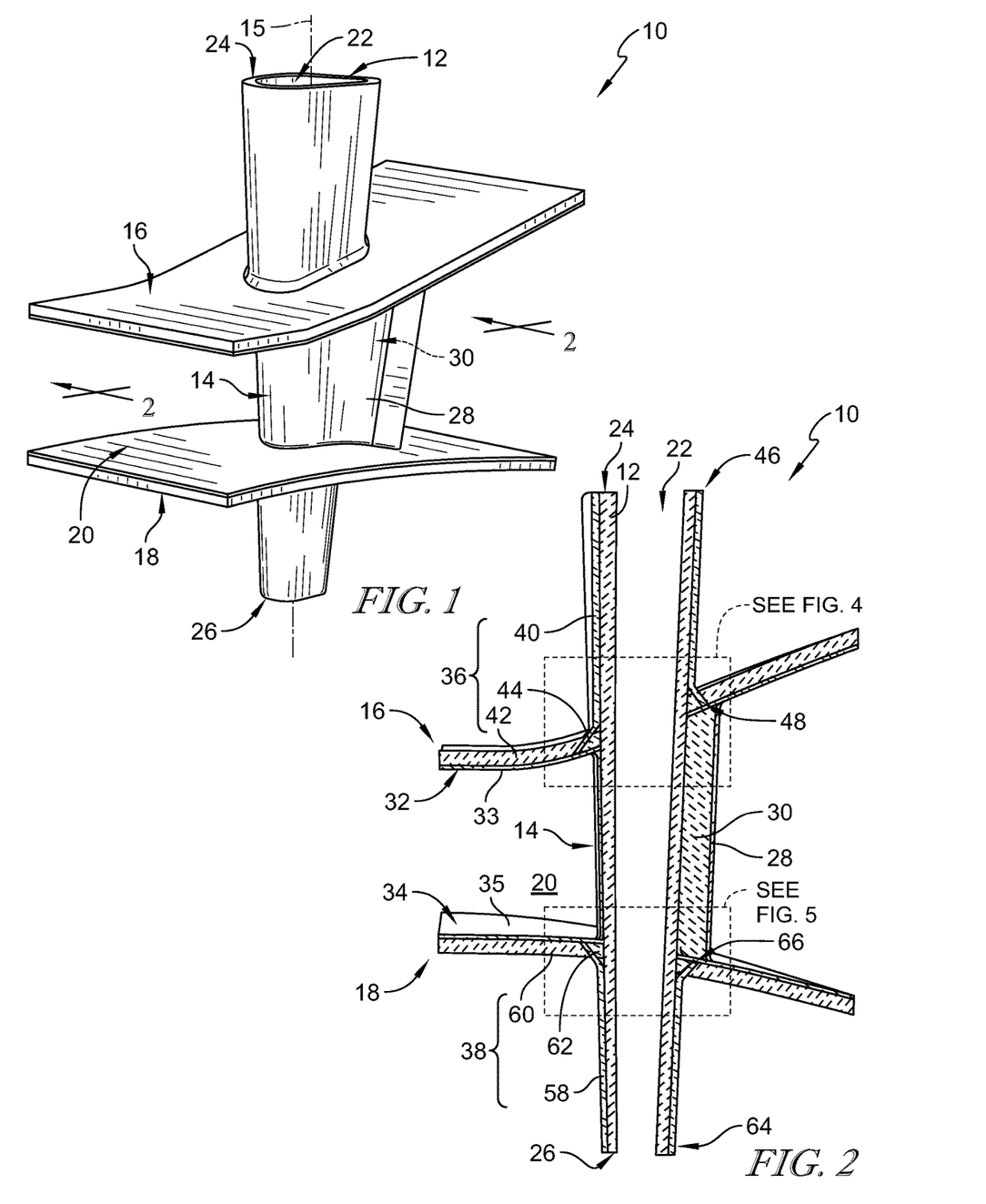
FIG. 1 is a perspective view of a turbine vane for use in a gas turbine engine made from ceramic matrix composite materials showing that the turbine vane includes (i) a vane support core extending generally along an axis and (ii) an airfoil coupled with the vane support core that is positioned along the axis between an outer end wall and an inner end wall.
FIG. 2 is a cross-sectional view taken along the line 2-2 in FIG. 1 showing that the turbine vane is constructed from a plurality of ceramic plies and/or preforms that are laid-up with one another and infiltrated with ceramic matrix material to form a one-piece ceramic matrix composite vane, and further showing that each end wall includes a locking layup that is configured to block axial movement of the outer and inner end walls relative to the vane support core once the one-piece ceramic matrix composite vane is fully assembled and processed.

A bladed component 10 for use in a gas turbine engine is shown in FIG. 1. The bladed component 10 is illustratively embodied as a turbine vane 10 that is formed from ceramic matrix composite materials (e.g. silicon carbide fibers in silicon carbide matrix) and includes a vane support core 12, an airfoil 14, an outer end wall 16, and an inner end wall 18. The vane support core 12 extends generally along an axis 15. The airfoil 14 is coupled with the vane support core 12 and is shaped to redirect hot gasses moving through a primary gas path 20 within the gas turbine engine. The outer end wall 16 and the inner end wall 18 are arranged generally perpendicular to the axis 15 and define the primary gas path 20 between one another.

The ceramic matrix composite materials forming the turbine vane 10 include a plurality of plies and/or preforms with ceramic-containing fibers. The plurality of plies and/or preforms are laid-up relative to one another and then infiltrated with ceramic matrix material to integrate the plies with one another and form a one-piece ceramic matrix composite turbine vane 10. The plurality of plies and/or preforms are shaped to block axial movement of the airfoil 14 and the end walls 16, 18 relative to the vane support core 12 as will be described in greater detail below.

The vane support core 12 is illustratively formed as a tube with a hollow cavity 22 that extends all the way through the vane support core 12 from a first end 24 to a second end 26 as shown in FIGS. 1 and 2. The first end 24 and the second end 26 are spaced axially from both the outer and inner end walls 16, 18 such that the vane support core 12 extends axially past the end walls 16, 18 in both axial directions. The vane support core 12 is configured to reinforce the vane 10 by supporting loads caused by differential pressures between the gas path 20 and the hollow cavity 22. The tube forming the vane support core 12 may formed from a multi-ply braid (bi-axial or tri-axial), a multi-layer two-dimensional woven tube, a two-dimensional "jelly roll" tube (i.e. a ceramic containing sheet or ply rolled-up), a three-dimensional woven tube, or any other suitable fiber architecture. In the illustrative embodiment, the vane support core 12 is formed from ten plies that are tri-axially braided with a high angle braid. In some embodiments, the vane support core 12 may be formed without a hollow cavity 22.

The airfoil 14 is coupled with the vane support core 12 between the outer end wall 16 and the inner end wall 18 as shown in FIGS. 1 and 2. The airfoil 14 includes an airfoil overwrap 28 that covers the vane support core 12 within the gas path 20 and an airfoil filler 30 that provides at least a portion of a trailing edge of the vane 10 within the gas path 20. In the illustrative embodiment, the airfoil overwrap 28 is formed as a tube or a folded sheet that completely surrounds the vane support core 12 and the airfoil filler 30 within the gas path 20. The tube or sheet forming the airfoil overwrap 28 may be a single or multiple ply preform with a two-dimensional, a two and one-half dimensional, or a three-dimensional construction. The airfoil filler 30 is formed as an insert or a noodle (i.e. loose strands of reinforcement fibers in matrix material) that is positioned adjacent to the vane support core 12 and is offset radially from the axis 15.

Figure 3:
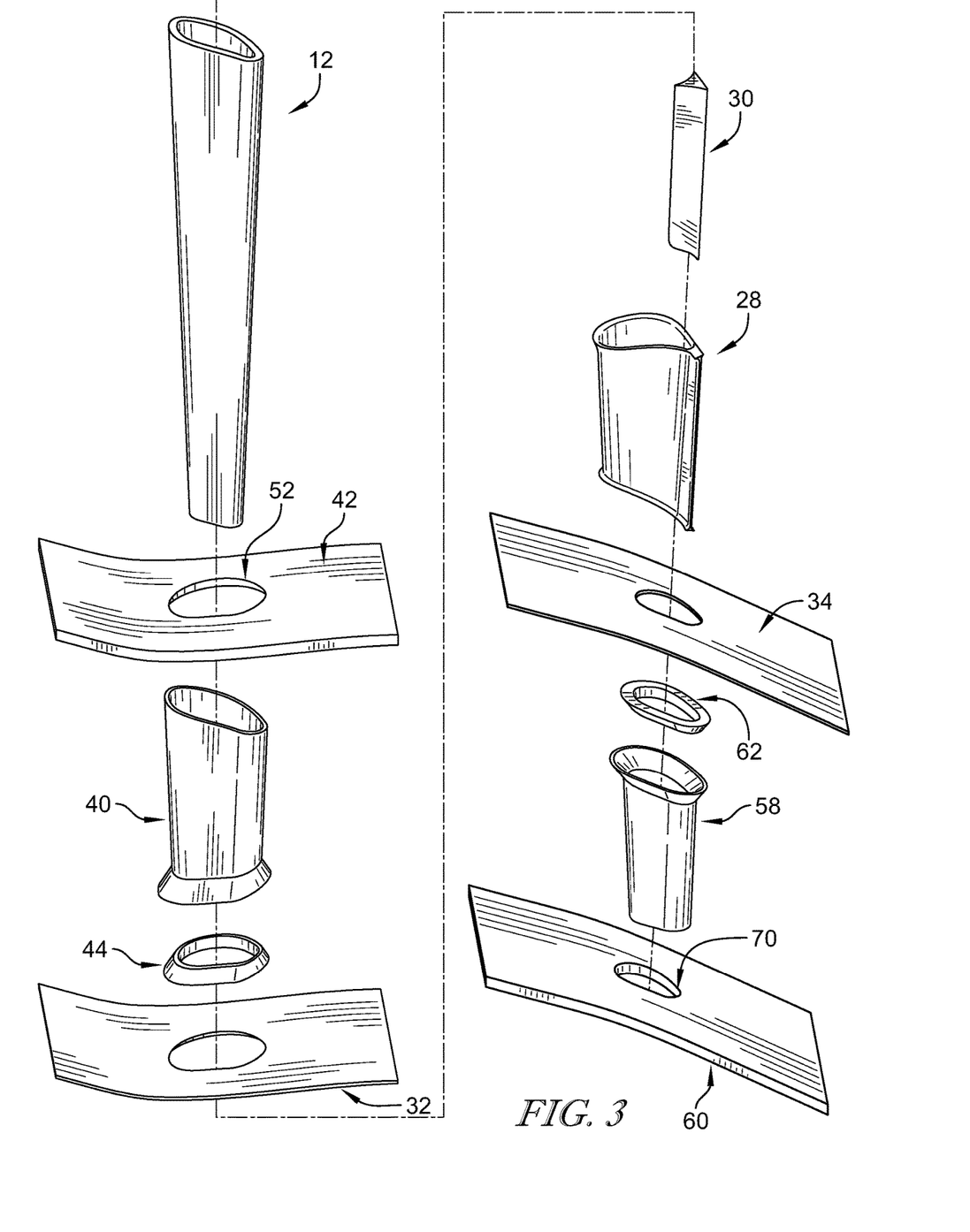
FIG. 3 is an exploded assembly view of the turbine vane of FIGS. 1 and 2 showing that each end wall includes a flow path ply and the locking layup, and showing that each locking layup includes a backing ply configured to be coupled with the flow path ply and a core overwrap configured to be coupled with the vane support core.

The outer and inner end walls 16, 18 each include at least one flow path ply 32, 34 and a locking layup 36, 38 as shown in FIGS. 2 and 3. Each flow path ply 32, 34 has a respective flow path surface 33, 35 that face one another and define axial boundaries of the gas path 20 relative to the axis 15. Each locking layup 36, 38 is coupled with the vane support core 12 and respective flow path ply 32, 34 to block axial movement of the end walls 16, 18 relative to the vane support core 12.

Figure 4:
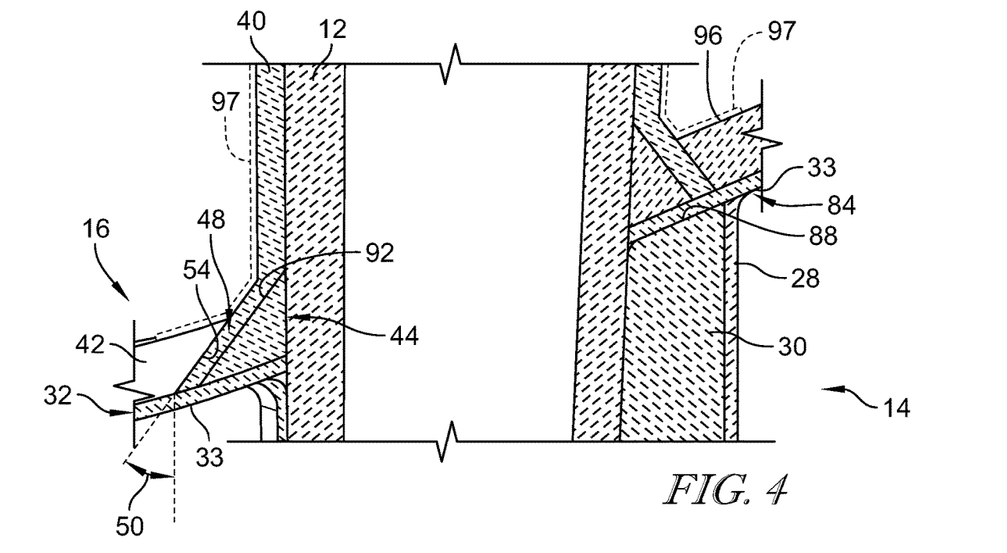
FIG. 4 is an enlarged view of a portion of the outer end wall and the vane support core from FIG. 2 showing the core overwrap of the locking layup included in the corresponding end wall coupled with the vane support core and interlocked with the flow path ply included in the corresponding end wall and the backing ply to block axial movement of the airfoil and the outer end wall relative to the vane support core.

The locking layup 36 of the outer end wall 16 includes a core overwrap 40, a backing ply 42, and an end wall filler 44 as shown in FIGS. 2-4. The core overwrap 40 is coupled with the vane support core 12 axially above the airfoil 14 and extends substantially along the axis 15 from a first end 46 corresponding with the first end 24 of the vane support core 12 to a second end 48 spaced axially from the first end 46 and abutting the flow path ply 32. The core overwrap 40 engages with an outer surface of the vane support core 12 except for the second end 48 which flares outward from the vane support core 12 away from the axis 15 at an angle 50. In the illustrative embodiment, the angle 50 between the second end 48 and the vane support core 12 is equal to about 45 degrees; however, in other embodiments, any suitable angle degree may be used.

The backing ply 42 is coupled with the flow path ply 32 opposite the flow path surface 33 and is formed to include a core-receiving space 52 that receives the vane support core 12 and the core overwrap 40 when the vane 10 is fully assembled. The core-receiving space 52 is defined by an angled surface 54 that also extends radially outward from the vane support core 12 at the angle 50. The second, flared end 48 of the core overwrap 40 engages the angled surface 54 of the backing ply 42 so that the core overwrap 40 is interlocked with the backing ply 42 and the flow path ply 32 to block axial movement of the end wall 16 relative to the vane support core 12.

Together, the flow path ply 32, the second end 48 of the core overwrap 40, and the vane support core 12 define a space 56 in which the end wall filler 44 is located. The end wall filler 44 provides spacing between the second end 48 and the vane support core 12 to maintain the second end 48 in engagement with the angled surface 54 of the backing ply 42. In the illustrative embodiment, the end wall filler 44 is formed from a deltoid coil that is plain woven with a continuous taper to provide a radially outer surface 92 that corresponds with the second end 48 of the core overwrap 40.

Figure 5:
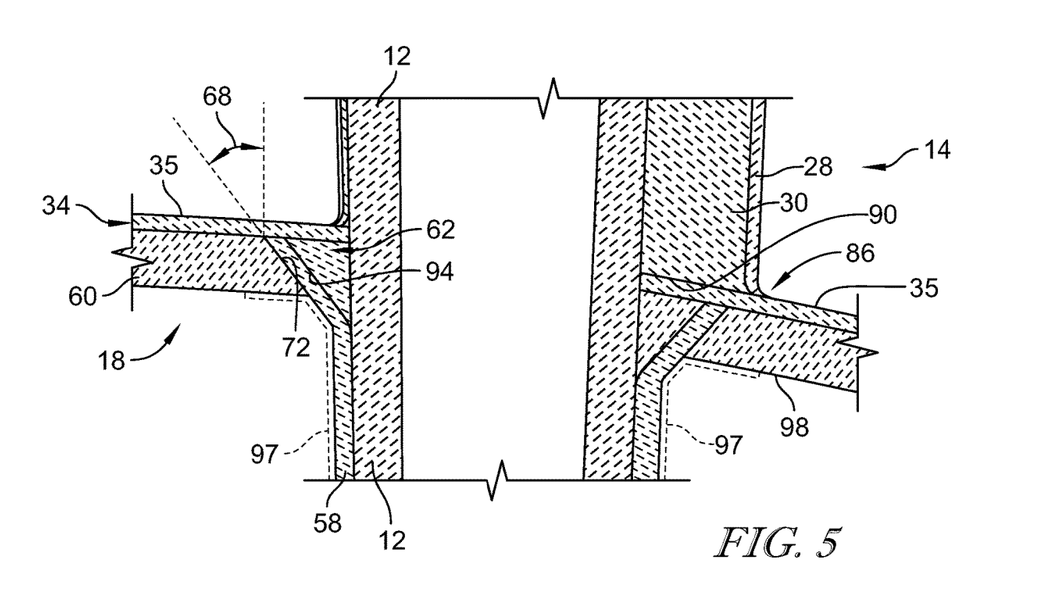
FIG. 5 is an enlarged view of a portion of the inner end wall and the vane support core from FIG. 2 showing the core overwrap of the locking layup included in the corresponding end wall coupled with the vane support core and interlocked with the flow path ply included in the corresponding end wall and the backing ply to block axial movement of the airfoil and the inner end wall relative to the vane support core.

The locking layup 38 of the inner end wall 18 is substantially similar to the locking layup 36 of the outer end wall 16. The locking layup 38 of the inner end wall 18 includes a core overwrap 58, a backing ply 60, and an end wall filler 62 as shown in FIG. 5. The core overwrap 58 is coupled with the vane support core 12 axially below the airfoil 14 and extends substantially along the axis 15 from a first end 64 corresponding with the second end 26 the vane support core 12 to a second end 66 spaced axially from the first end 64 and abutting the flow path ply 34. The core overwrap 58 engages an outer surface of the vane support core 12 except for the second end 66 which flares outward from the vane support core 12 away from the axis 15 at an angle 68. In the illustrative embodiment, the angle 68 between the second end 66 and the vane support core 12 is equal to about 45 degrees; however, in other embodiments, any suitable angle degree may be used.

The backing ply 60 is coupled with the flow path ply 34 opposite the flow path surface 35 and is formed to include a core-receiving space 70 that receives the vane support core 12 and the core overwrap 58 when the vane 10 is fully assembled. The core-receiving space 70 is defined by an angled surface 72 that also extends radially outward from the vane support core 12 at the angle 68. The second, flared end 66 of the core overwrap 58 engages the angled surface 72 of the backing ply 60 so that the core overwrap 58 is interlocked with the backing ply 60 to block axial movement of the end wall 18 relative to the vane support core 12.

Together, the flow path ply 34, the second end 66 of the core overwrap 58 and the vane support core 12 define a space 74 in which the end wall filler 62 is located. The end wall filler 62 provides spacing between the second end 66 and the vane support core 12 to maintain the second end 66 in engagement with the angled surface 72 of the backing ply 60. In the illustrative embodiment, the end wall filler 62 is formed from deltoid coil that is plain woven with a continuous taper to provide a radially outer surface 94 that corresponds with the second end 66 of the core overwrap 58.

Each flow path ply 32, 34 is formed to include a core receiving space 76, 78 that receives the vane support core 12 as shown in FIGS. 4 and 5. The flow path surface 33, 35 of each flow path ply 32, 34 engages directly the vane support core 12 and locate the end wall fillers 44, 62 axially between the flared, second ends 48, 66 and the flow path plies 32, 34. The airfoil overwrap 28 has first and second ends 84, 86 that are slightly flared radially outward from the vane support core 12 and engage respective flow path surfaces 33, 35 of the flow path plies 32, 34. The airfoil filler 30 also has first and second ends 88, 90 that engage respective flow path surfaces 33, 35 of the flow path plies 32, 34. In this way, the flared ends 84, 86 of the airfoil overwrap 28 and the airfoil filler 30 help block axial movement of the inner and outer end walls 16, 18 relative to the vane support core 12. In the illustrative embodiment, the airfoil overwrap 28 is formed from two two-dimensional plies that flare outwardly at ends 84, 86 to provide a fillet with at most about a 2 millimeter radius.

Each core overwrap 40, 58 may be formed from a bi-axially braided tube, a multi-ply two-dimensionally woven tube, or a three-dimensionally woven tube. In the illustrative embodiment, each core overwrap 40, 58 includes about 5 to about 7 plies that are bi-axially braided to provide a tube with a flared end 48, 66; however, any suitable number of plies may be used. Additional plies 97 may be added to the core overwraps 40, 58 and extend along an outer surface 96, 98 of each respective backing ply 42, 60 to increase blockage of axial movement of the end walls 16, 18 relative to the vane support core 12 as suggested in FIGS. 4 and 5.

The flow path plies 32, 34 may be formed from a plurality of two-dimensional plies that are layered on top of one another or a single three-dimensionally woven preform. Similarly, each backing ply 42, 60 may be formed from a plurality of two-dimensional plies that are layered on top of one another or a single three-dimensionally woven preform. In the illustrative embodiment, the backing plies 42, 60 are formed with a greater number of two-dimensional plies and/or a greater axial thickness than the flow path plies 32, 34. However, in other embodiments, the number of two-dimensional plies and/or the thickness of the backing plies 42, 60 may be the same or less than the flow path plies 32, 34. Illustratively, the flow path plies 32, 34 are formed from four two-dimensional plies while the backing plies are formed from fourteen two-dimensional plies.

Once the plies and/or preforms forming the inner and outer end walls 16, 18 are assembled as described above, all of the plies/preforms forming the vane 10 are infiltrated with ceramic matrix material and processed to solidify and form the one-piece ceramic matrix composite vane 10. In the illustrative embodiment, the plies are first processed through chemical vapor infiltration and then processed though slurry-melt infiltration; however, in other embodiments, any suitable infiltration process may be used. After infiltration, interlaminar bonding between the core overwraps 40, 58 and the vane support core 12 block axial movement of the core overwraps relative to the vane support core. Similarly, the backing plies 42, 60 are coupled to corresponding flow path plies 32, 34 through interlaminar bonding. With the second ends 48, 66 of the core overwraps 40, 58 interlocked between corresponding backing plies 42, 60 and flow path plies 32, 34, axial movement of the end walls 16, 18 relative to the vane support core 12 is blocked.

In some embodiments, as ceramic matrix composites (CMC) may be used in turbine vane applications. CMCs in vane applications may provide the ability to reduce both weight (due to low density) and cooling air (due to increased material operating temperatures). The reduction in cooling air may yield benefits to specific fuel consumption in the form of reduced fuel burn. The present disclosure described herein is a method for manufacturing a CMC vane with integral endwalls 16, 18.

In some embodiments, the central portion 12 of the vane 10 is envisioned as a multi ply braid (bi-axial or tri-axial), multi-layer 2D woven, 20 "jelly-rolled", or 3D woven structure that is designed to deal with differential pressure loads between the inside of the airfoil 14 and the flow path 20. The aerodynamic shape of the vane is then formed by inserting a trailing edge insert or noodle 30 which is constrained by an overwrap 28 which could be a single or multiple 2D plies, a 2½D construction, or 3D construction.

In some embodiments, in order to attach the end walls 16, 18 to the central portion 12 of the airfoil, a method of manufacture that provides the structural integrity to resist the differential pressure loads across the end wall may be used. According to one aspect of the present disclosure, each end wall is constructed in two distinct pieces prior to consolidation. The platform 32, 34 forms the flow path and may be constructed of a plurality of 2D plies or a 3D preform. The locking platform 42, 60 is formed by a plurality of 20 plies or a 3D preform.

In some embodiments, the locking platform 42, 60 will have an angled surface 54, 72 roughly 45 degrees to the flow path surface 33, 35 that engages with the tube overwrap 40, 58. This tube overwrap 40, 58 may be a bi-axial braided, multi-ply 2D woven, or 3D structure that has an inner surface coincident with the outer surface of the central portion 12 (meaning the relationship shown in FIGS. 4 and 5) of the vane until it contacts a noodle 44, 62 that forces it out at the roughly 45 degree angle. The locking platform 42, 60 is locked in place by the angled out portion of the tube overwrap 40, 58. The aforementioned noodle 44, 62 is positioned radially by the inner portion of the platform 32, 34 (or tooling prior to the inner portion of the platform being brought into place) and circumferentially by the central portion 12 of the vane to which it is coincident.

In some embodiments, the platform 16, 18 may be prohibited from moving radially in ward by three features in accordance with the present disclosure: (i) the trailing edge insert 30; (ii) interlaminar bonding between the platform 32, 34 and the locking platform 42, 60; and (iii) a slight flaring of the airfoil overwrap 28.

In some embodiments, additional tube overwrap plies 97 are added in a manner that these plies splay over the top of the locking platform 42, 60. These additional layers may perform two functions: (i) protect the locking platform/tube overwrap ply interface from cracking, and/or (ii) provide additional strength relative to radial motion of the assembly.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane made from ceramic matrix composite materials and adapted for use in an aerospace gas turbine engine, the turbine vane comprising a vane support core arranged along an axis between a first end and a second end, an airfoil arranged radially outward from the vane support core relative to the axis and spaced apart axially from the first end and the second end of the vane support core, and a first end wall and a second end wall spaced axially from the first end wall, each end wall including a flow path ply with a flow path surface facing toward the airfoil and the first end wall further including a locking layup integrated with the vane support core and the flow path ply of the first end wall, wherein the locking layup includes (i) a core overwrap engaged with an outer surface of the vane support core and formed with a locking flange that flares radially outward away from the airfoil core relative to the axis and (ii) a backing ply engaged with the flow path ply of the first end wall opposite the flow path surface and formed to include a cutout that receives the vane support core and the core overwrap and has an angled surface that engages with the locking flange of the core overwrap so that when the locking layup is integrated with the vane support core and the flow path ply of the first end wall, the airfoil and the first end wall are blocked from axial movement relative to the vane support core.

2. The turbine vane of claim 1, wherein a space is formed radially between the vane support core and the locking flange and the locking layup further includes an end wall filler positioned in the space.

3. The turbine vane of claim 1, wherein the airfoil includes an airfoil overwrap ply that extends circumferentially around the vane support core and a trailing edge filler insert offset radially from the airfoil core relative to the axis.

4. The turbine vane of claim 3, wherein the airfoil overwrap ply has a flared end that abuts the flow path surface of the flow path ply.

5. The turbine vane of claim 3, wherein the trailing edge insert is positioned radially between an outer surface of the vane support core and an inner surface of the airfoil overwrap ply.

6. The turbine vane of claim 1, wherein the core overwrap extends from the first end of the vane support core to the flow path ply and the locking flange abuts the flow path ply of the first end wall.

7. The turbine vane of claim 1, wherein the second end wall further includes a second locking layup integrated with the vane support core and the second flow path ply to block axial movement of the airfoil and the second end wall relative to the vane support core.

8. The turbine vane of claim 7, wherein the second locking layup includes (i) a second core overwrap engaged with the outer surface of the vane support core and formed with a second locking flange that flares radially outward away from the vane support core relative to the axis and (ii) a second backing ply engaged with the flow path ply of the second end wall and formed to include a second cutout that receives the vane support core and the second core overwrap and has a second angled surface that engages with the second locking flange of the second core overwrap.

9. The turbine vane of claim 1, wherein the core overwrap includes a first core overwrap with the locking flange that flares radially outward away from the vane support core and engages the angled surface of the backing ply and a second core overwrap with a second locking flange that extends outwardly from the vane support core and engages the backing ply and is spaced apart from the locking flange of the first core overwrap to locate the angled surface of the backing ply axially between the locking flange of the first core overwrap and the second locking flange of the second core overwrap.

10. The turbine vane of claim 1, wherein the vane support core is formed to include a hollow cavity that extends axially through the vane support core along the axis.

11. The turbine vane of claim 1, wherein the flow path ply includes a plurality of flow path plies and the backing ply includes a plurality of backing plies and the number of backing plies is greater than the number of flow path plies.

12. The turbine vane of claim 1, wherein the locking flange extends outwardly away from the vane support core at an angle of about 45 degrees relative to the axis.

13. A bladed component made from ceramic matrix composite materials comprising
a support core arranged along an axis from a first end to a second end of the support core and formed to include a hollow cavity that extends through the support core along the axis,
an airfoil coupled with the support core radially outward from the support core with respect to the axis, and
an end wall including a flow path ply and a backing ply each arranged generally perpendicular to the axis, and
wherein the end wall is blocked from axial movement relative to the support core by a core overwrap that overwraps the support core adjacent the backing ply and by an airfoil overwrap ply that overwraps the support core adjacent the backing ply, and the core overwrap includes an axially-inner flared end interlocked with the flow path ply and the backing ply.

14. The bladed component of claim 13, wherein the backing ply is formed to include a cutout that receives the support core and the core overwrap and has a surface that extends radially away from the support core at an angle and the flared end of the core overwrap engages the surface.

15. The bladed component of claim 13, wherein a space is formed radially between the support core and the flared end of the core overwrap and the end wall further includes an end wall filler positioned in the space.

16. The bladed component of claim 13, wherein the airfoil overwrap ply extends circumferentially around the support core and the airfoil includes a trailing edge filler insert offset radially from the support core relative to the axis.

17. A method of constructing a turbine vane adapted for used in an aerospace gas turbine engine with a central rotation axis, the method comprising
providing an vane support core that extends along an axis between a first end of the vane support core and a second end of the vane support core,
coupling an end wall to the vane support core between the first end of the vane support core and the second end of the vane support core, the end wall including a flow path ply defining a flow path surface and a backing ply abutting the flow path ply opposite the flow path surface,
overwrapping the vane support core with an airfoil overwrap ply adjacent to the flow path ply and a core overwrap adjacent to the backing ply,
flaring an axially-inner end of the core overwrap radially outward away from the vane support core, and
interlocking the axially-inner end of the core overwrap with the flow path ply and the backing ply to block movement of the airfoil overwrap ply and the end wall in an axial direction relative to the vane support core.

18. The method of claim 15, wherein the backing ply is formed to include a cutout that receives the vane support core and the core overwrap and has a surface that extends radially away from the vane support core at an angle and the flared end of the core overwrap engages the surface.

19. The turbine vane of claim 15, wherein a space is formed radially between the vane support core and the flared end of the core overwrap and the end wall further includes an end wall filler positioned in the space.

20. The method of claim 15, wherein the end wall is a first end wall and method further includes:
coupling a second end wall to the vane support core between the first end of the vane support core and the second end of the vane support core, the second end wall spaced axially from the first end wall to define a flow therebetween, the second end wall including a second flow path ply defining a second flow path surface and a second backing ply abutting the second flow path ply opposite the second flow path surface,
overwrapping the vane support core with a second core overwrap adjacent to the second backing ply,
flaring an axially-inner end of the second core overwrap radially outward away from the vane support core, and
interlocking the axially-inner end of the second core overwrap with the second flow path ply and the second backing ply to block movement of the airfoil overwrap ply and the second end wall in an axial direction relative to the vane support core.

* * * * *